Feb. 2, 1971 J. P. GUILLIAMS 3,560,267
VALVING DEVICE FOR ELECTROCHEMICAL GENERATORS OR THE LIKE
Filed Nov. 19, 1968 3 Sheets-Sheet 1
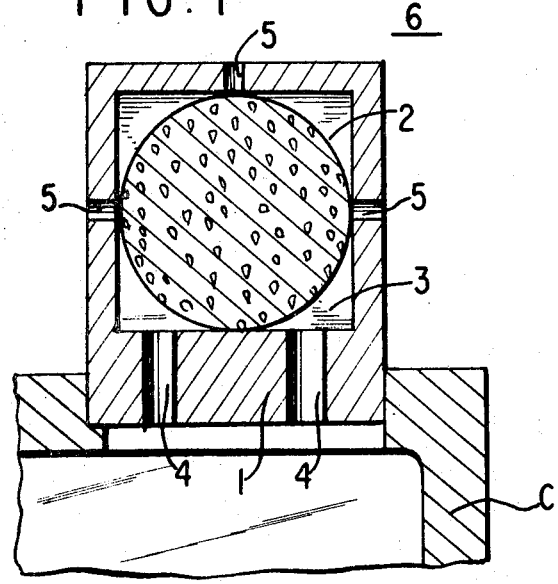
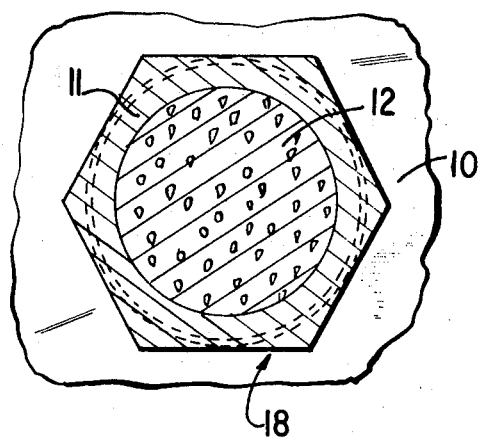
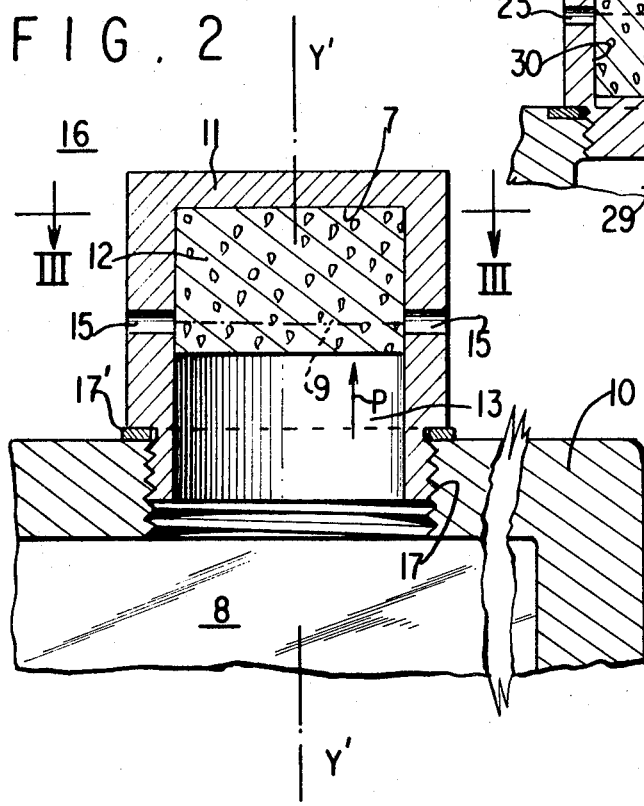
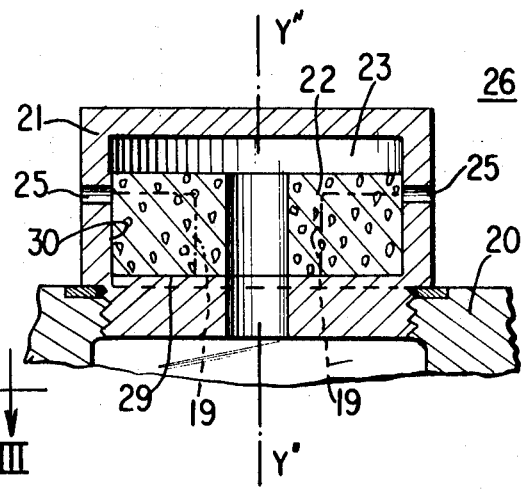
INVENTOR
JEAN PAUL GUILLIAMS
BY
ATTORNEYS Feb. 2, 1971 J. P. GUILLIAMS 3,560,267
VALVING DEVICE FOR ELECTROCHEMICAL GENERATORS OR THE LIKE
Filed Nov. 19, 1968 3 Sheets-Sheet 3

INVENTOR
JEAN PAUL GUILLIAMS
BY
ATTORNEYS

United States Patent Office 3,560,267
Patented Feb. 2, 1971

3,560,267
VALVING DEVICE FOR ELECTROCHEMICAL GENERATORS OR THE LIKE
Jean P. Guilliams, Paris, France, assignor to Societe des Accumulateurs Fixes et de Traction (Societe Anonyme), Romainville, Seine-Saint-Denis, France, a company of France
Filed Nov. 19, 1968, Ser. No. 777,118
Claims priority, application France, Nov. 22, 1967, 129,269
Int. Cl. H01m *1/06*
U.S. Cl. 136—178
14 Claims

ABSTRACT OF THE DISCLOSURE

A valving device in particular for electrochemical generators of semi-sealed type capable of providing exit communication between the enclosure of the generator and the exterior environment, the valving device being of a type comprising a hollow part having a cavity in communication with said enclosure and the exterior via one or more exit orifices or passages which place the enclosure in communication with the exterior environment and including an obturating elastic body lodged in such cavity and capable of volumetric change for freeing or clearing said exit orifices or passages under given differential pressures appearing between said enclosure and said exterior enviromnent and sealing or obturating said orifices or passages when said pressure differential conditions are not present. The obturating body lodged in the cavity is compressible and elastic and its volume is variable and decreases as pressure upon it increases, being constituted primarily of an elastic porous or alveolate body whose pores or cells are sealed off and contain gas such as imprisoned air that is compressible. The variation in elastic volume of the body is obtained thanks to the compressibility of the imprisoned gas in one or more of the pores or cells that are bounded by elastic partitioning walls.

BRIEF SUMMARY OF INVENTION

This invention relates to a valving device or arrangement useful particularly with electrochemical generators or semi-sealed type and being capable of providing exit communication between the enclosure of the generator and surrounding exterior environment, the valving device being of a type associable with the enclosure of the generator and comprising a hollow valve part having a cavity in communication with both the enclosure and exterior environment by way of one or more exit orifices or passages and including an obturating element lodged in said cavity and closing off the exit orifices or passageways and capable of clearing or freeing the latter under given differentials of pressure appearing between said enclosure and exterior environment by volumetric changes and of closing off said passages or orifices automatically by expansion when said pressure differential is not present.

The obturating body lodged in the cavity is a compressible elastic porous or alveolate body whose volume is variable and which decreases as pressure upon it increases and is constituted primarly of an elastic porous alveolate body whose pores or cells are sealed off and enclose and confine imprisoned gas such as air and whose variation in elastic volume is obtained thanks primarily to the compressibility of the imprisoned gas in one or more of the enclosing cells or pores which are bounded by elastic partitioning walls.

Valving arrangements of this type called safety valves may be utilized in a number of arrangements especially where there is danger of bursting of the container or enclosure due to excessive pressure therein. Especially such valving arrangements are usually utilized for containers of accumulators or batteries which are liable to develop dangerous internal gaseous overpressures during charge or inversion of the latter. In particular, this problem is encountered in sealed alkaline cells or batteries.

In order to avoid such explosions, the containers of such cells or batteries have had mounted thereon various types of valves intended to open at definite internal pressures to permit escape of gas to the exterior environment and automatically to reclose when relief is obtained and which are supposed to function anew each time as required. The technical problems encountered in realization of such valves have existed for a long time and numerous solutions have been proposed. Among these, known solutions are those which utilize elastic change of form with constant volume of a body subject to action of pressure. Also, membranes, O-ring seals suitably disposed are capable of deformation with constant volume to break the previously provided seal, thus permitting the internal pressure to diminish within the enclosure on which the valving arrangement is mounted.

One can also cite solutions in which a clapper or flap valve is applied over an orifice in a manner to assure sealing in repose.

Technical progress is exacting in requiring great reduction in weight and volume of apparatus and in particular of valving arrangements and also in augmentation of their reliability. Known realizations have not proved satisfactory in practice.

The present invention has among its objects and features novel valving arrangements based upon a principal of functioning that is different from known valving devices and the provision of simple embodiments that are not cumbersome and are remarkably effective.

A valving arrangement in accord with the invention for the intended purposes is notable particularly in that its sealing element comprises an elastic compressible obturating body whose volume decreases with increasing pressure so as to effect uncovering at least one exit passageway above mentioned in the valve part of the device. In other words, the invention utilizes elastic changes in volume of a body and not as usual heretofore changes in its form without modification of volume.

According to another feature and characteristic of the invention, the said compressible obturating body of variable volume is constituted essentially by gas such as air imprisoned in one or more pores or cells closed off by elastic partitions. The elastic variation in volume is thus obtained because of the compressibility of the imprisoned gas in one or more of the elastically partitioned cells or pores. Thereby a great amplitude of elastic deformation is obtained which exceeds greatly that obtainable merely by deformation of elastic material alone.

The elastic variations in volume of the compressible body of this invention are due primarily to the reversible compressibility of a confined gas and presents a reversibility which is not possible with merely plastic and solid elastic materials alone such as have been utilized in the prior art.

In accord with the invention, the elastic compressible body is a hollow cellular or alveolate or porous body whose internal cells are sealed off and imprison gas such as air therein.

Advantageously, when uniform action is desired, the hollow alveolate cellular porous material of such body has its cells distributed uniformly.

According to one embodiment, the preferably smooth surface of said compressible body is capable of closing off or obturating the said evacuating or exit passages or orifices; according to a variant this obturation can be further assured by an undeformable solid member associated with said body and not by the compressible body itself, but subject to the action thereof. Furthermore, it is particularly advantageous to provide a plurality of exit passageways or orifices.

The form of the elastic compressible obturating body, the shape of the cavity in the valve body and location and number of the exit orifices or passageways are selected as a function of the desired results and permit a large flexibility of use and manufacture of valving arrangements with certainty of functioning for very high ranges of pressures, these valving arrangements functioning, for example, according to the construction characteristics selected for very low or for relatively high pressure differentials.

This latitude of function is obtained by judicious choice of relationship between the solid elastic mass and the imprisoned gaseous mass of the compressible obturating body. If a valving arrangement that is very sensitive to low pressures is desired, the relationship selected is very small, whereas, on the contrary, if sensitivity to elevation pressures is desired, the selected relationship is very large.

Other objects and features of the invention will become apparent from the following detailed description and the accompanying drawings ilustrating various modifications by way of example, and wherein:

FIG. 1 is a cross-sectional view of a valving arrangement of a first embodiment of the invention;

FIG. 2 shows a similar view of a variant mounted on a casing of an electrochemical cell or battery;

FIG. 3 is a sectional view taken on the plane of line III—III of FIG. 2;

Figure 8:
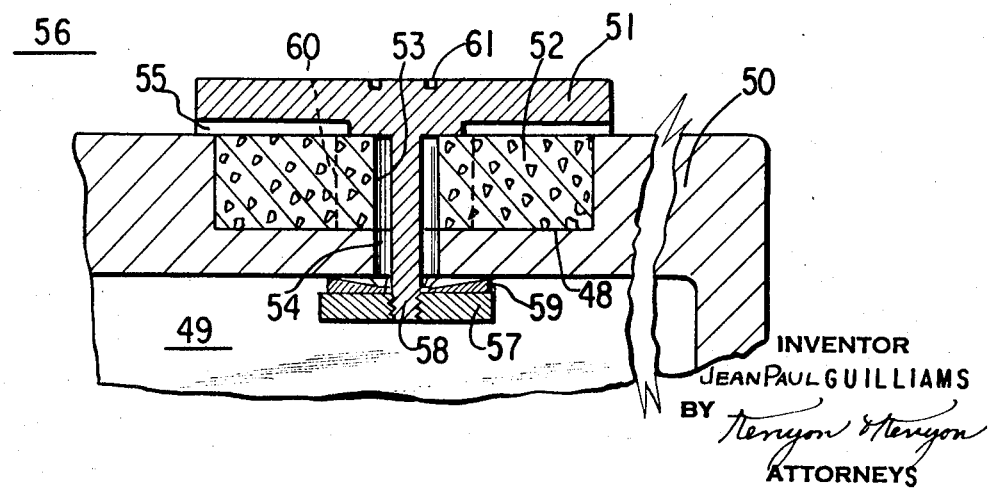
Figure 9:
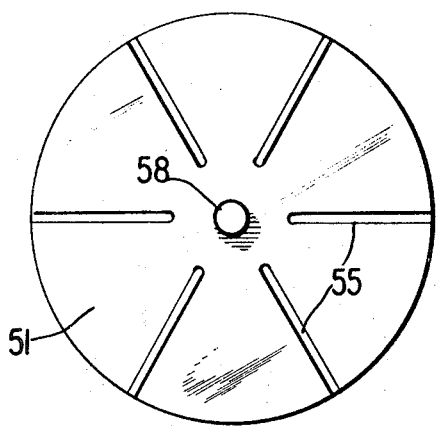
Figure 10:
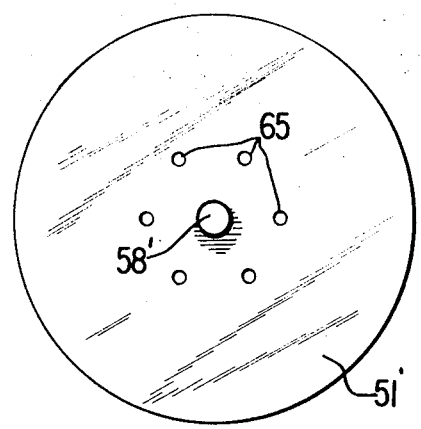
Figure 11:
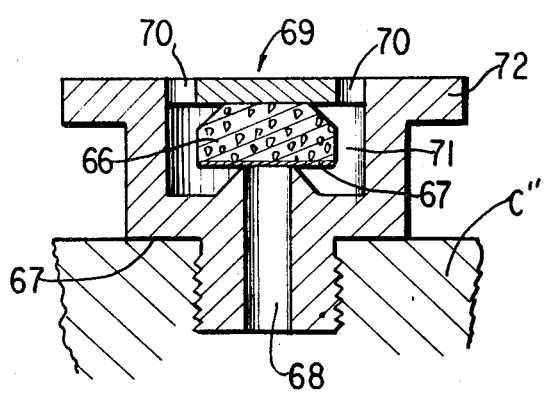
Figure 12:
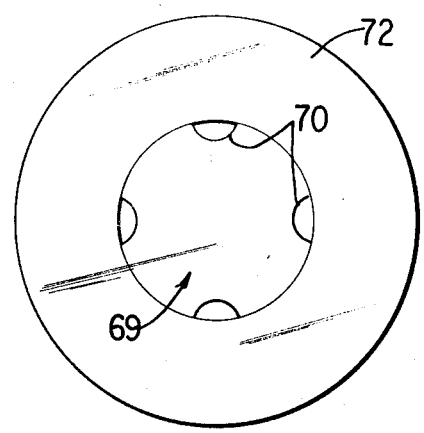

FIGS. 4–7 inclusive show sectional views similar to FIG. 1 of four other variants of valving arrangement constructions;

FIG. 8 shows similarly still further somewhat different variant;

FIG. 9 is a bottom plan view of a cover or lid part for FIG. 8;

FIG. 10 is a similar view of a variant of construction of the cover or lid part for FIG. 8;

FIG. 11 shows a sectional view of a further embodiment for an elastic compressible obturating body; and FIG. 12 is a bottom plan view of a cover part for FIG. 11.

DETAILED DESCRIPTION

Referring now to the drawings and first to FIG. 1, the embodiment therein comprises a valve part 1 in which the obturating compressible body 2 is situated. The valve part 1 includes a cavity 3 which is in direct communication with the interior of the enclosure of, for example, the casing C of an electrochemical generator via channels 4. Exit orifices or passages 5 are provided in the wall of the valve part 1 so as to place the cavity 3 in communication with the external environment 6.

In the example illustrated in FIG. 1, the cavity 3 has the form of a cubic parallelepiped and the obturating body 2 is a substantially spherical ball of elastic alveoate or porous compressible material normally maintained in a partially compressed condition within the interior of said cavity 3. This obturating body 2 must be of material resistant to operating conditions within the cell or battery, e.g. to heat, to electrolyte and the like, being composed, for example, of an expanded synthetic foam of closed or sealed cells in whose cells or pores gas such as air is imprisoned. The outer wall or skin of the compressible obturating body 2 is advantageously chosen to be smooth.

In the absence of significant pressure in the interior of the cavity 3, the surface of the obturator body 2 normally presses against and closes off the exit passages 5 cutting off communication therethrough to the external environment 6. When internal pressure from the battery casing C occurs, it is transmitted to cavity 3 via channels 4 and as a result, the obturator body 2 becomes compressed and the volume of its ball diminishes and some at least of the exit passageways 5 are cleared permitting gas under built-up pressure in the battery casing C and cavity 3 to escape via such exit passageways to the exterior environment and thus relieve the pressure. When the internal pressure built-up in the cell and cavity 3 have been relieved and return to normal value, the ball body 2 returns to its initial volume and position as shown in FIG. 1 in which the exit passageways 5 are again obturated. The compressible gas or air imprisoned in the different individual sealed pores or alveoli of body 2 permit elastic changes in the volume of said body.

In the modification shown in FIG. 2, the obturating body 12 is shown as being mounted in a cylindrical valve part 11 having an internal cylindrical cavity 13 whose axis is y–y'.

In this case, the compressible obturating body 12 of the same material as body 2 is advantageously fixed, for example, as by being pasted or glued to a part of the inner face 7 of the valve part 11.

In normal position of utilization, the obturating body 12 being only feebly compressed, the exit passages 15 between the cavity 13 and the external environment 16 are obturated by the lateral smooth walls of the cylindrical obturating body 12. When the pressure in the interior 8 of the cell or battery casing 10 rises, the body 12 is compressed volumetrically in the axial direction shown by arrow p to clear and open the exit passages 15 and permit the escape therethrough of gases in the cell interior 8 and thus relieve such pressure.

In this embodiment of FIG. 3, it is to be noted that the screwing of the valving arrangement into the wall of the casing 10 of the cell is facilitated by providing the external surface of the valve part 11 with faces 18 forming a hexagon so as to permit one to tighten the valve part 11 into position, a suitable sealing washer 17' being provided.

In the embodiment shown in FIG. 4, resembling that of FIG. 2, wherein corresponding parts are designed by the same digits increased by 10, the chief difference is that the compressible elastic obturating body 22 of the same material as body 12 is a cylindrical annulus rather than a cylinder. In addition, this obturating body 22 is adhered partly by its external smooth face 29 to a limited portion of the inner wall 30 of body 21 below the exit passages 25. When pressure in the cavity 23 from the battery gases arises and enters via the central opening of said obturating body 22 into cavity 23, the body 22 is deformed or compressed volumetrically to condition indicated by dotted line 19, causing exposure of exit passageways 25 and as a result permitting gas escape and relief of internal pressure in cavity 23 and also within the casing 20 of the battery on which the valve part 21 is mounted.

Figure 5:
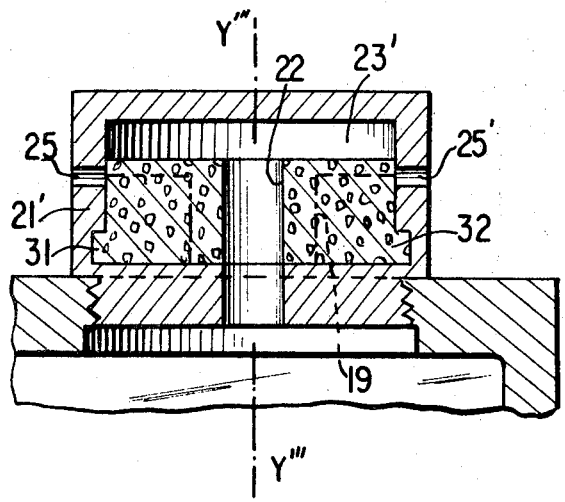

In the embodiment of FIG. 5 which is a variant of that of FIG. 4, the annularly shaped obturator body 22' is kept in position within the cavity 23' of the valve body 21' as by means of a groove 31 provided in the wall defining said cavity in which an annular tongue 32 of said body 22' is engaged. This eliminates need for any adherence between obturator body 22' and valve part 21'. Operation otherwise of this embodiment for pressure relief is the same as that of FIG. 4.

Figure 6:
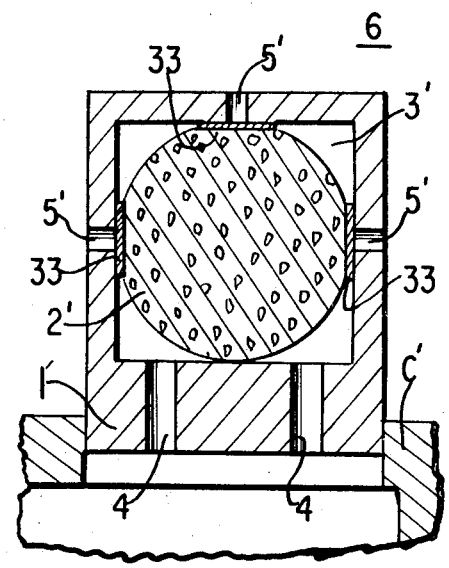

The embodiment of FIG. 6 is quite similar to that of FIG. 1, primed reference characters therein being identical with corresponding parts designated by unprimed reference characters in FIG. 1. In addition, the obturator body 2' of FIG. 6 is provided on its outer surface with disc-like elements 33 covering and overlying the inner margins of the respective exit passages 5' and playing the part of clappers which are held in sealing relationship over the inner openings of these exit passages 5' by the pressure exerted by the resilient obturating body 2'. This reinforces the sealing effect by the pressure derived from the semi-compressed obturating body 2'. When pressure rises in cavity 3' from gases in casing C', the ball-like body 2' is further compressed in its volume relieving sealing pressure on the clappers 33 and exposing passages 5' to relieve internal gas pressure in casing C' and cavity 3'. These elements or clappers 33 can be constituted by case hardened zones on the requisite surface portions of the ball-like body 2' opposite said exit passages 5' or may be separate rigid pieces inlaid and secured thereto at the required locations relative to exit passages 5'.

Figure 7:
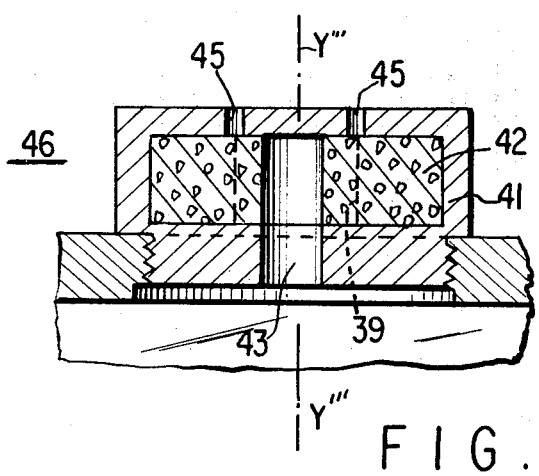

In the embodiment shown in FIG. 7, elements with reference characteristics increased by 20 correspond to like elements of FIG. 4. The exit passages 45 from the enclosure cavity 43 to the exterior environment 46 are located on the upper wall of valve part 41 and not in lateral walls as are passage 25 of FIG. 4.

The compression of annular obturating body 42 is applied internally of said body when gas pressure arises in the cell casing and effects volumetric compression thereof to the dotted line position 39 clearing exit passages 45 to permit pressure relief.

It is to be noted that in the embodiment of FIG. 7 it is not necessary to adhere the obturator body to inner wall faces of valve part 41 since obturator body 42 fills the cavity of said valve part and its position thus prevents displacement therein.

Furthermore, it can be seen in the various examples so far described that, if desired, the elastic obturator body can be selected to be in part compressible and porous and with another part of the surface thereof non-porous being adapted to have pressure applied thereto. This double choice permits having an obturating body of selected characteristics, with greater or less volumetric deformability in required directions. This permits construction with like types of obturating bodies of elastic deformable volumes for several valving arrangements capable of functioning at different pressures as well as permitting a large range of pressure differentials.

In the embodiment shown in FIG. 8, the valving arrangement is constituted in part by wall part 50 of a battery cell, for example, in which the valving arrangement is incorporated. It includes a lid element 51 which is fixed relative to wall part 50 as will be described. A cavity 53 is provided in wall part 50 below the lid element 51 and an obturating body 52 of the same material as those previously described of annular form is mounted in this cavity or in a crown similar to part 42 of FIG. 7. Obturating body 52 may be adhered along its exterior wall 48 to the wall 50. Communication with the interior of cells is effected by a passage 54 and by channels 55 in lid 51 which provide communication between cavity 53 and the external environment 56 are seen best in FIG. 9 and are radially arranged on the under face of lid 51.

Mounting of lid 51 on wall 50 is, for example, effected by a nut 57 screwed onto a stem 58 integral with the lid, a preferably perforate collar 59 being interposed between nut 57 and the inner face of wall 50.

When internal gas pressure builds up in battery space 49 it is communicated to cavity 53 by passage 54 and the obturator body 52 is compressed in volume radially outwardly as indicated by dotted lines 60. This clears the closed off passages 55 permitting venting of the internally developed gases via passages 55 to the exterior environment and relief of internal pressure. These passages preferably have a rectangular or triangular transverse section so as to avoid failure to expose them completely by the volumetrically compressed obturator body 52.

Notches 61 to facilitate the screwing of the valving arrangement are provided on lid 51. The diameter of lid 51 may be lesser than the diameter of the cavity formed in wall 50. Thus the lid 50 may be at least partially housed in the said cavity.

In the variant showings in FIG. 10, the radial channels 55 of the lid 51 of FIGS. 8 and 9 are replaced by orifices 65 in lid 51'. The operation is like that of FIGS. 8 and 9.

In the embodiment shown in FIGS. 11 and 12, the elastic obturating body 66 has a smooth flap 67 applied to its base overlying the outer rim of the orifice of passage 68 which communicates with the battery enclosure C" whose pressure is to be controlled. The obturating body 66 is maintained under pressure by a disc 69 provided with fluted passages 70 which place cavity 71 in communication with the external environment.

Disc 69 is preferably force fitted into the valve part 72 and compresses the obturating body 66 to the extent desired so that the pressure relief will occur at selected internal battery pressures. The valve arrangement of this embodiment functions as follows: Pressure which develops in the canal 68 is transmitted to cavity 71 and operates on flap 67 and through it on the volumetrically compressible body 66. When sufficient force is exerted, the flap 67 is lifted permitting escape of gas to the exterior environment via flutes 70 until restoration of desired normal internal pressure occurs when the flap 67 is again restored to sealing position.

In this embodiment, the obturator body 66 simply replaces a spring and this is in accord with the invention and presents considerable advantages. In fact, it is well known that ordinary springs are subject to aging, that is to say they do not retain their mechanical qualities and valves using them cease rapidly to function at the pressure for which they have been constructed and adjusted because of such aging. According to the invention, the effect of aging is practically negligible since the compressibility of the obturator body 66 is due essentially to imprisoned gas which it contains in its pores or cells and which mechanically speaking do not age.

If the flap 67 is, for example, glued to body 66 and the latter in turn is glued to disc 69, centering will occur automatically when the body is put into place.

Preferably body 66 is a frustum to avoid effect of accidental displacement and thus will not obturate the fluted orifices 70.

Such a valving arrangement can be miniaturized and lodged partially or entirely in the wall of an enclosure, for example, of a battery or cell and control its internal pressure. Simultaneously, it can serve as a current terminal.

Numerous variations can be visualized of the modifications described. Thus, the diverse embodiments described can be associated with all appropriate sealed arrangements, for example, of known types to prevent escape of liquid, notably electrolyte in the cavity of the valving arrangement during their functioning. Likewise, if the obturating body or its valve part are at least in part metallic and if mounted in an insulating wall, they can also serve as a terminal for the battery.

The forms of the valve part and of the obturating elastic body likewise are variable. For example, the valve part and/or the obturating body can be cylindrical or pyramidic. In the embodiment of FIG. 1, the body 1 could be cylindrical and have vertical grooves to permit access of gas above the cavity, the obturator body then being, for example, cylindrical or ovoid. Furthermore, selected forms of orifices for maximum efficacy of function can be selected.

It is to be understood that variations in structure within the scope of the appended claims are possible and are contemplated. There is no intention, therefore, of limitation to the exact abstract or disclosure herein presented.

What is claimed is:

1. A valving arrangement for providing automatic relief from predetermined pressure build-up within a confined space comprising a closed casing and a hollow valve part having a cavity therein, said valve part being mounted on said casing and said cavity therein being in communication with said confined space, said valve part having exit passageways communicating with said cavity and the exterior, obturating means positioned within said cavity so that said means normally seals said exit passageways but becomes volumetrically reduced upon predetermined gas pressure build-up within said space to cause said volumetrically reduced obturating means within said space to clear at least one of said exit passageways and maintain such clearance until the gas pressure build-up falls below said predetermined pressure to thereby effect relief of said build-up pressure, said means on completion of relief returning to initial volume and exit passageway sealing condition, said obturating means being a body of elastic alviolate cellular material, the individual cells of said body being sealed relative to each other to imprison compressible gas therein and said cellular body being alterable volumetrically by gas pressure applied theerto in said cavity and derived from pressure build-up in said space.

2. A valving arrangement according to claim 1 wherein the cells of said cellular body are substantially uniformly distributed.

3. A valving arrangement according to claim 1 wherein said cavity is substantially a cubic parallelepiped and said body has a ball-like form.

4. A valving arrangement according to claim 1, wherein said cavity is substantially cylindrical, said body likewise has cylindrical shape and said exit passageways extend laterally through a side wall of said valve part.

5. A valving arrangement according to claim 4, wherein a portion of said body is adhered to a portion of an internal face of said valve part.

6. A valving arrangement according to claim 1, wherein said cavity is substantially cylindrical and said body is a cylindrical annulus, and means for fixing said annulus within said cavity.

7. A valving arrangement according to claim 6, wherein said last-named means comprises adhesive adhering said annulus to a portion of a wall of said cavity.

8. A valving arrangement according to claim 6, wherein siad means comprises a groove in a portion of a wall of said cavity and a shoulder on said annulus engaged in said groove.

9. A valving arrangement according to claim 1, wherein said exit passageways extend longitudinally through an upper wall of said cavity and said obturating body is annular and normally seals off said exit passageways.

10. A valving arrangement according to claim 1, wherein said body includes clapper elements positioned to overlie and normally seal off said exit passageways.

11. A vlving arrangement according to claim 10 wherein said clapper elements are secured to said body.

12. A valving arrangement according to claim 1, wherein said obturating body has a smooth external surface which normally closes off and seals said exit passageways.

13. A valving arrangement according to claim 1, wherein said body is of synthetic material.

14. An electrochemical generator whose components are positioned within a confined space, said generator being subject to internal pressure buld-up during charging and overcharging, said generator including a valving arrangement for providing automatic relief of said pressure build-up at a determined value and comprising a hollow valve part having a cavity communicating with said space and said cavity having at least one exit passageway to permit escape of gas pressure build-up within said space, and obturating means comprisng a body of elastic alveolate cellular material whose individual cells are sealed and imprison compressible gas therein, said body being alterable volumetrically in response to said pressure build-up within said space as delivered to said cavity so as to expose said exit passageways at determined pressure and thus permit relief of determined pressure built up within said space.

References Cited

UNITED STATES PATENTS

| | | | |
|---|---|---|---|
| 2,790,570 | 4/1957 | Hodges et al. | 136—178UX |
| 3,166,498 | 1/1965 | Otto | 210—130 |

FOREIGN PATENTS

| | | | |
|---|---|---|---|
| 1,423,543 | 12/1966 | France | 136—178 |

DONALD L. WALTON, Primary Examiner

U.S. Cl. X.R.

220—44